(12) United States Patent
Schwartz et al.

(10) Patent No.: US 12,484,735 B2
(45) Date of Patent: Dec. 2, 2025

(54) COOKING ASSEMBLY COMPRISING AN ELECTRICAL COOKING APPLIANCE AND A DRAINING RECEPTACLE

(71) Applicant: SEB S.A., Ecully (FR)

(72) Inventors: Delphine Schwartz, Dijon (FR); Frédéric Pain, Varois-et-Chaignot (FR); Frédéric Seurat, Bretigny (FR)

(73) Assignee: SEB S.A. (FR)

( * ) Notice: Subject to any disclaimer, the term of this patent is extended or adjusted under 35 U.S.C. 154(b) by 1061 days.

(21) Appl. No.: 17/298,162

(22) PCT Filed: Nov. 25, 2019

(86) PCT No.: PCT/EP2019/082440
§ 371 (c)(1),
(2) Date: May 28, 2021

(87) PCT Pub. No.: WO2020/109238
PCT Pub. Date: Jun. 4, 2020

(65) Prior Publication Data
US 2021/0393080 A1    Dec. 23, 2021

(30) Foreign Application Priority Data

Nov. 30, 2018    (FR) ...................................... 1872133

(51) Int. Cl.
*A47J 37/12*    (2006.01)

(52) U.S. Cl.
CPC ....... *A47J 37/1285* (2013.01); *A47J 37/1257* (2013.01); *A47J 37/1295* (2013.01)

(58) Field of Classification Search
CPC . A47J 37/1285; A47J 37/1257; A47J 37/1295
See application file for complete search history.

(56) References Cited

U.S. PATENT DOCUMENTS

| 5,289,933 A | * | 3/1994 | Streich | ................ | B65D 88/526 |
| | | | | | 220/4.31 |
| 6,382,108 B1 | * | 5/2002 | Stanek | ............... | B65D 19/0038 |
| | | | | | 206/386 |

(Continued)

FOREIGN PATENT DOCUMENTS

| EP | 1504705 A1 | 2/2005 |
| EP | 2103240 A1 | 9/2009 |

OTHER PUBLICATIONS

International Search Report for Application No. PCT/EP2019/082440, dated Jan. 27, 2020, 2 pages.

*Primary Examiner* — Edward F Landrum
*Assistant Examiner* — Kuangyue Chen
(74) *Attorney, Agent, or Firm* — Lerner David LLP

(57) ABSTRACT

The invention relates to a cooking assembly (1) which comprises an electrical cooking appliance (2) and a draining receptacle (70), the electrical cooking appliance (2) comprising a vessel (10) provided with a draining device (60) that has a valve (61), the draining receptacle (70) having a control member, and the cooking assembly (1) having a draining configuration in which the draining receptacle (70) supports the electrical cooking appliance (2) and in which the control member moves the valve (61) into the open position. According to the invention, the draining receptacle (70) comprises upper supports that are part of pillars which project from a side wall (75) of the draining receptacle (70), and the electrical cooking appliance (2) rests on said upper supports when the cooking assembly (1) is in the draining configuration.

14 Claims, 10 Drawing Sheets

(56) References Cited

U.S. PATENT DOCUMENTS

| | | | | |
|---|---|---|---|---|
| 2009/0087534 A1* | 4/2009 | McLemore | ......... | A47J 37/1209 |
| | | | | 426/523 |
| 2017/0265683 A1* | 9/2017 | Gogel | ................. | A47J 37/1266 |
| 2019/0125130 A1* | 5/2019 | Denning | ............. | A47J 37/1266 |
| 2020/0315388 A1* | 10/2020 | Dirand | .................... | A47J 36/08 |

* cited by examiner

COOKING ASSEMBLY COMPRISING AN ELECTRICAL COOKING APPLIANCE AND A DRAINING RECEPTACLE

CROSS REFERENCE TO RELATED APPLICATIONS

The present application is a national phase entry under 35 U.S.C. § 371 of International Application No. PCT/EP2019/082440 filed Nov. 25, 2019, published in French, which claims priority from French Patent Application No. 1872133 filed Nov. 30, 2018, all of which are incorporated herein by reference.

TECHNICAL FIELD

The present invention generally relates to the technical field of electric cooking appliances comprising a vat capable of receiving a cooking bath, and also to their accessories.

The present invention relates in particular, but not exclusively, to electric deep fryers comprising a vat capable of receiving an oil or fat bath for frying foods, as well as to their accessories.

The present invention relates more particularly to an assembly comprising an electric cooking appliance comprising a vat equipped with a drainage system, as well as a draining receptacle configured such that the electric cooking appliance can be carried during the draining operation.

PRIOR ART

Document EP1504705 discloses a cooking appliance comprising a vat equipped with a drainage system. The vat can be placed on a draining receptacle to drain the contents of the vat into the draining receptacle. The draining receptacle is associated with a removable lid. The lid must be removed to be able to drain the contents of the vat. The draining receptacle has an annular support area intended to receive the vat. The support area is formed by a projection from the internal side wall of the draining receptacle. Positioning the vat to perform the drainage operation is not very easy.

SUMMARY OF THE INVENTION

One purpose of the present invention is to propose a cooking assembly comprising an electric cooking appliance and a draining receptacle that are safe to use.

Another purpose of the present invention is to propose a cooking assembly comprising an electric cooking appliance and a draining receptacle that are economically constructed.

Another purpose of the present invention is to propose a cooking assembly comprising an electric cooking appliance and a draining receptacle that are limited in size.

These purposes are achieved with a cooking assembly comprising an electric cooking appliance and a draining receptacle, the electric cooking appliance comprising a vat capable of receiving a cooking bath, the vat being equipped with a drainage system comprising a valve capable of assuming a stable closed return position and an open position, the draining receptacle presenting a control element, the cooking assembly presenting a drainage configuration in which the draining receptacle holds the electric cooking appliance and in which the control element moves the valve to the open position due to the fact that the draining receptacle comprises upper supports belonging to pillars originating from a side wall of the draining receptacle and that the electric cooking appliance rests on the upper supports when the cooking assembly is in the drainage configuration. This arrangement makes it possible to rigidify the side wall of the draining receptacle holding the electric cooking appliance, which contributes to improving the stability of the electric cooking appliance when it is held by the draining receptacle. This arrangement also makes it possible to reduce the dimensions of the cooking assembly.

Then, advantageously, the draining receptacle has a bottom and each of the upper supports originates from the bottom of the receptacle. This arrangement helps makes it easier to construct the draining receptacle. This arrangement also makes it possible to improve the rigidity of these upper supports.

Also advantageously, the draining receptacle has two opposite sides and at least some of the pillars originate from one of the opposite sides. This arrangement helps limit the dimensions of the draining receptacle and makes the draining receptacle easier to build.

Then, advantageously, all of the pillars originate from the opposite sides. This arrangement makes it possible to achieve good rigidification of the side wall of the draining receptacle when it is holding the electric cooking appliance.

Also advantageously, the draining receptacle has a configuration that is elongated in one direction and the two opposite sides extend in said direction. This arrangement helps limit the dimensions of the draining receptacle.

Also advantageously, the electric cooking appliance has lower supports spaced apart from each other and configured to rest on a support plane. This arrangement makes it easier to handle the electric cooking appliance.

Then, advantageously, the electric cooking appliance has support zones resting on the upper supports when the cooking assembly is in the drainage configuration, and the support zones are distinct from the lower supports. This arrangement makes it possible to prevent the lower supports of the electric cooking appliance from coming into contact with the draining receptacle.

Then, advantageously, when the lower supports rest on a support plane, the support zones extend away from said support plane. This arrangement makes it possible to avoid any contact between the support zones and the support plane on which the appliance rests.

According to one embodiment, the electric cooking appliance comprises an outer housing encasing the vat and the outer housing rests on the draining receptacle when the cooking assembly is in the drainage configuration. As an alternative, the electric cooking appliance may have no outer housing encasing the vat, the vat then being able to rest on the drainage receptacle when the cooking assembly is in the drainage configuration.

Then, advantageously, the outer housing forms a skirt. In other words, the outer housing has no bottom. This arrangement makes it easier to construct the outer housing.

Then, advantageously, the lower supports are arranged under the skirt.

Then, advantageously, the support zones (6a, 6b, 6c, 6d) are arranged under the skirt.

BRIEF DESCRIPTION OF THE DRAWINGS

The invention will be best understood from the study of an exemplary embodiment, taken without any limitation, illustrated in the attached FIGS. 1 to 15, and of variants.

FIG. 5 is an exploded perspective view of the draining base illustrated in

FIGS. 1 and 2.

DESCRIPTION OF THE EMBODIMENTS

Figure 1:
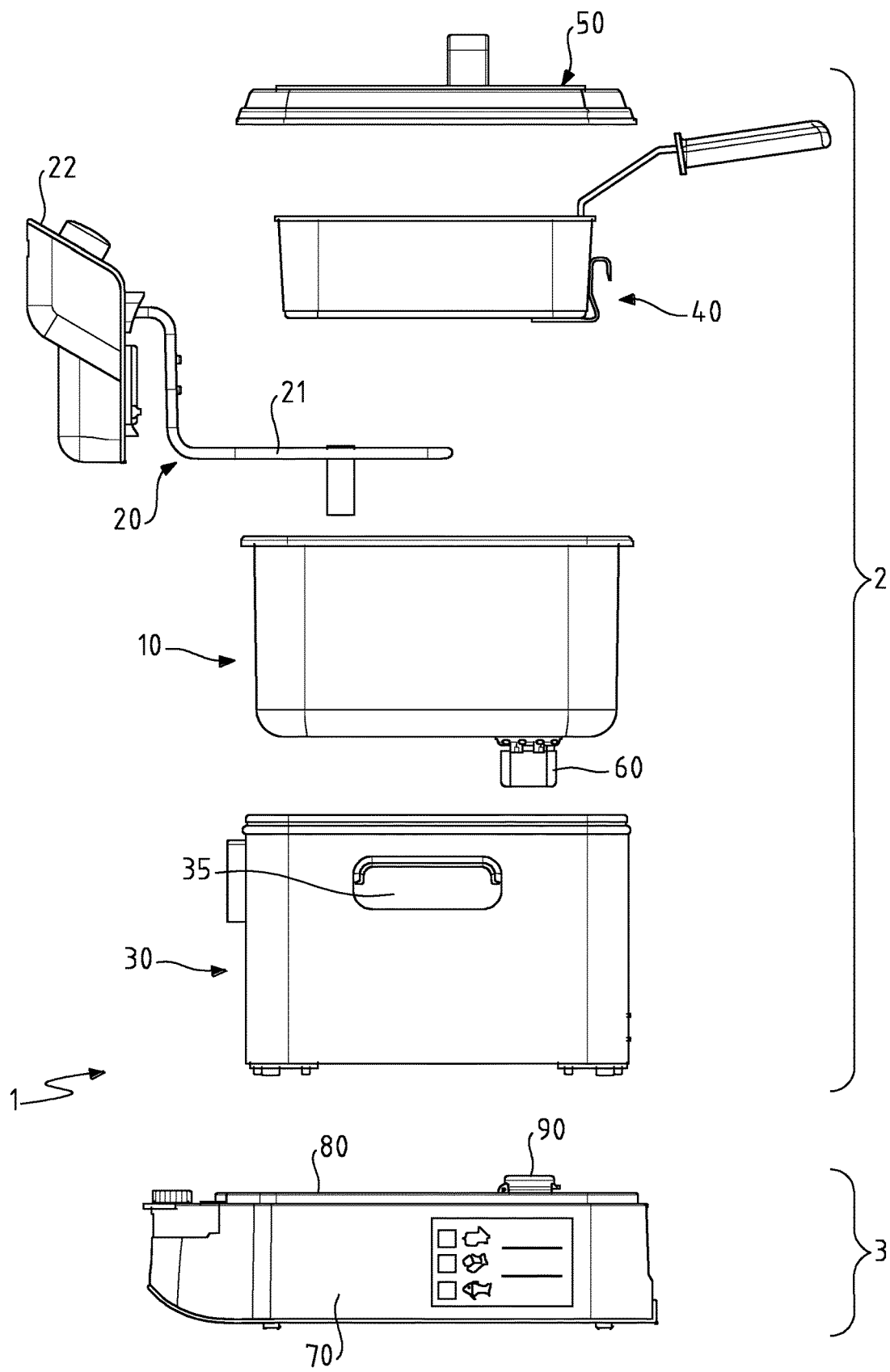
FIG. 1 illustrates an exemplary embodiment of a cooking assembly according to the invention, comprising an electric cooking appliance and a draining receptacle, shown in elevation, the electric cooking appliance being shown in an exploded view, the draining receptacle holding a receptacle lid, the draining receptacle and the receptacle lid forming a draining base.
Figure 2:
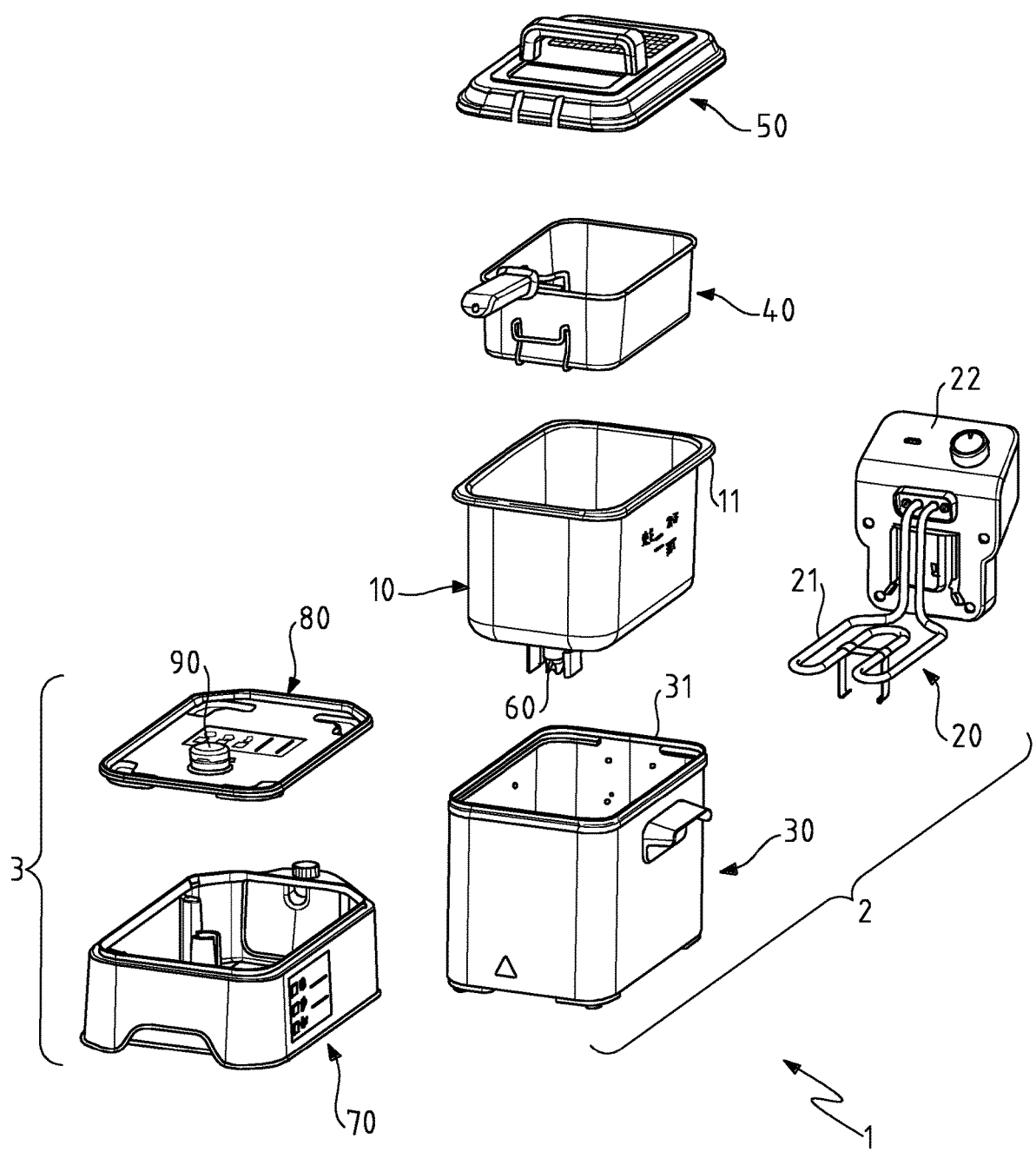
FIG. 2 is an exploded perspective view of the electric cooking appliance and the draining receptacle of the cooking assembly illustrated in FIG. 1, the receptacle lid also being shown in an exploded view.
Figure 3:
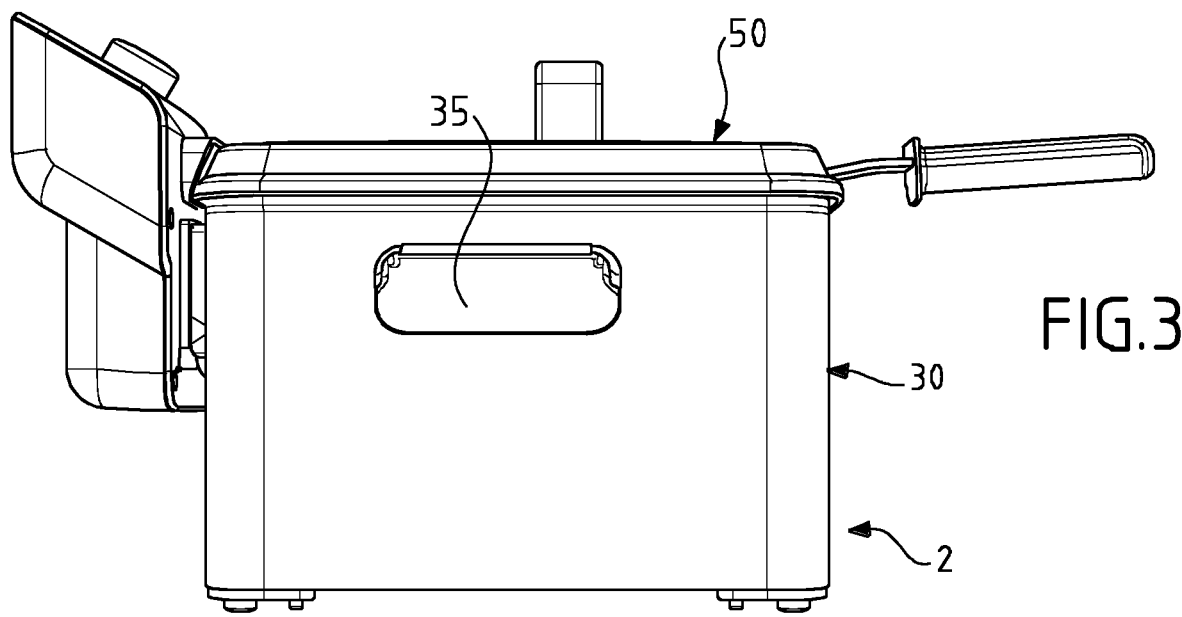
FIG. 3 is a side view of the electric cooking appliance illustrated in FIGS. 1 and 2.

The cooking assembly 1 illustrated in FIGS. 1 and 2 comprises an electric cooking appliance 2 and a draining receptacle 70. The draining receptacle 70 is configured to hold the electric cooking appliance 2. The draining receptacle 70 can be used with a receptacle lid 80 to form a draining base 3. A lid cap 90 is mounted on the receptacle lid 80.

Figure 4:
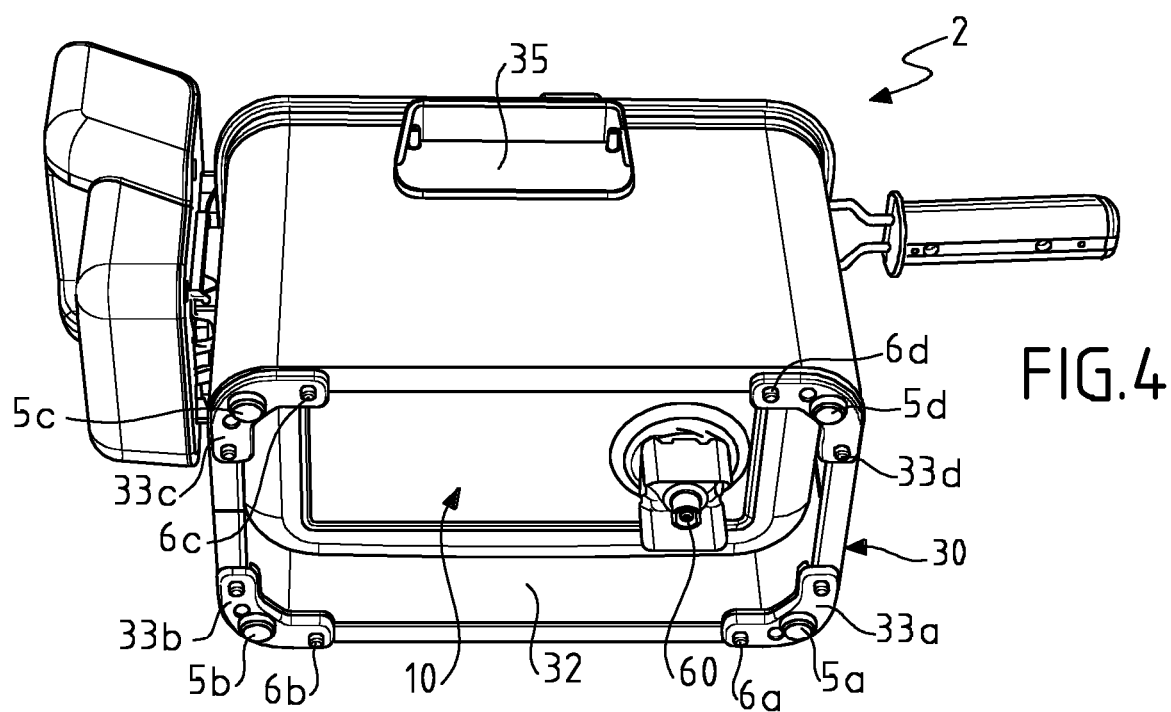
FIG. 4 is a perspective bottom view of the electric cooking appliance illustrated in FIGS. 1, 2 and 3.

As can be seen in FIG. 4, the electric cooking appliance 2 has lower supports 5a, 5b, 5c, 5d spaced apart from each other. The lower supports 5a, 5b, 5c, 5d are configured to rest on a support plane.

The electric cooking appliance 2 comprises a vat 10 capable of receiving a cooking bath. The vat 10 is equipped with a drainage system 60, which can be seen in FIGS. 1, 2, 4, 9, 11 and 12.

The electric cooking appliance 2 comprises an electric heating device 20. In the exemplary embodiment illustrated in FIGS. 1 and 2, the electric heating device 20 is designed to directly heat the cooking bath. To this end, the electric heating device 20 comprises an electrical resistor 21 configured to be immersed in a cooking bath contained in the vat 10. The electric heating device 20 also comprises a control box 22 on which the electrical resistor 21 is mounted. If the electrical resistor 21 extends inside the vat 10, the control box 22 extends outside the vat 10. Alternatively or in addition, the electric heating device 20 may in particular be configured to heat the vat 10. The electric heating device 20 can then be attached to the vat 10, or be removable relative to the vat 10. The electric heating device 20 can be associated with a temperature control device and a thermal safety device, not shown in the figures. The temperature control device is for example a thermostat. The thermal safety device is, for example, a thermal fuse or a resettable thermal limiter. As a variant, the electric heating device can be configured to heat the vat without being immersed in the cooking bath contained in the vat. The electric heating device is thus not necessarily attached to the vat.

The electric cooking appliance 2 can comprise an outer housing 30 encasing the vat 10. As can be best seen in FIGS. 4, 9 and 10, the outer housing 30 forms a skirt 32. The skirt 32 has four sides. The outer housing 30 comprises separate housing feet 33a, 33b, 33c, 33d, which can be best seen in FIG. 4. According to the embodiment illustrated in the figures, the housing feet 33a, 33b, 33c, 33d are arranged in the lower angles of the outer housing 30 and extend in two directions under the sides of the skirt. Thus, the housing feet 33a, 33b, 33c, 33d are L-shaped. The lower supports 5a, 5b, 5c, 5d are arranged under the housing feet 33a, 33b, 33c, 33d.

As shown in FIGS. 1 and 2, the vat 10 is removably mounted in the outer housing 30. The outer housing 30 can have gripping elements 35, in particular two opposite upper handles. According to a usual embodiment, the vat 10 has an outer edge 11 configured to rest on an upper edge 31 of the outer housing 30, as can be best seen in FIG. 2. As an alternative, the vat 10 may in particular be attached to the outer housing 30, or the electric cooking appliance 2 may in particular be devoid of an outer housing 30.

The electric cooking appliance 2 can comprise a basket 40 configured to contain foods immersed in a cooking bath contained in the vat 10.

The electric cooking appliance 2 can comprise an appliance lid 50 designed to cover the vat 10. If desired, the appliance lid 50 can be configured for use in the operating configuration. Alternatively, the appliance lid 50 can be configured for use only in the storage configuration.

Figure 9:
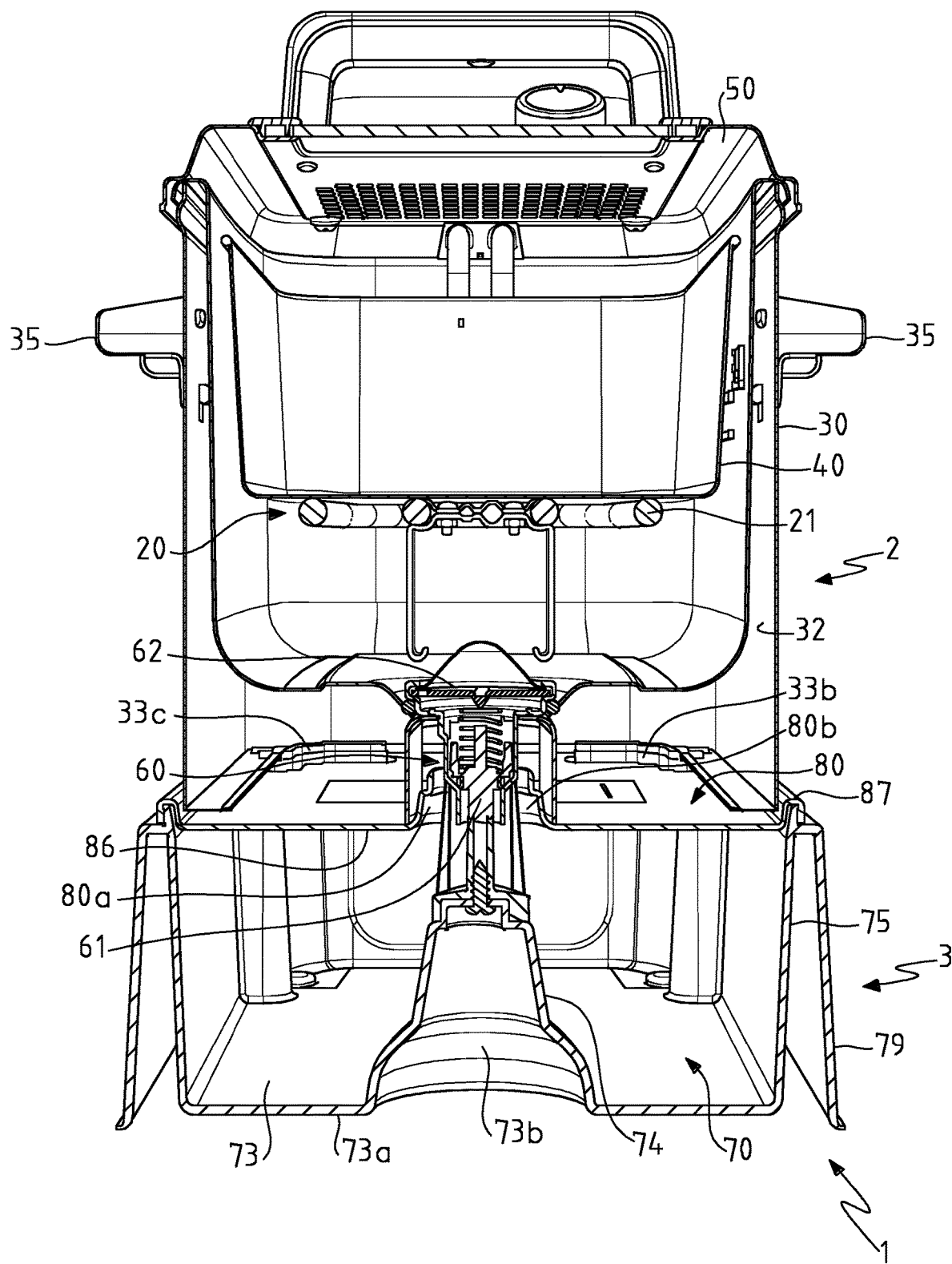
FIG. 9 is a cross-section view in elevation of the cooking assembly illustrated in FIGS. 1 and 2, in a drainage configuration corresponding to a recommended drainage configuration in which the receptacle lid is used to close the draining receptacle.

The drainage system 60 comprises a valve 61, which can be best seen in FIG. 9. The drainage system 60 is preferably installed in the bottom of the vat 10. If desired, a thermostat valve 62 can be arranged upstream of the valve 61 to prevent the cooking bath from draining if the cooking temperature is too high.

Figure 5:
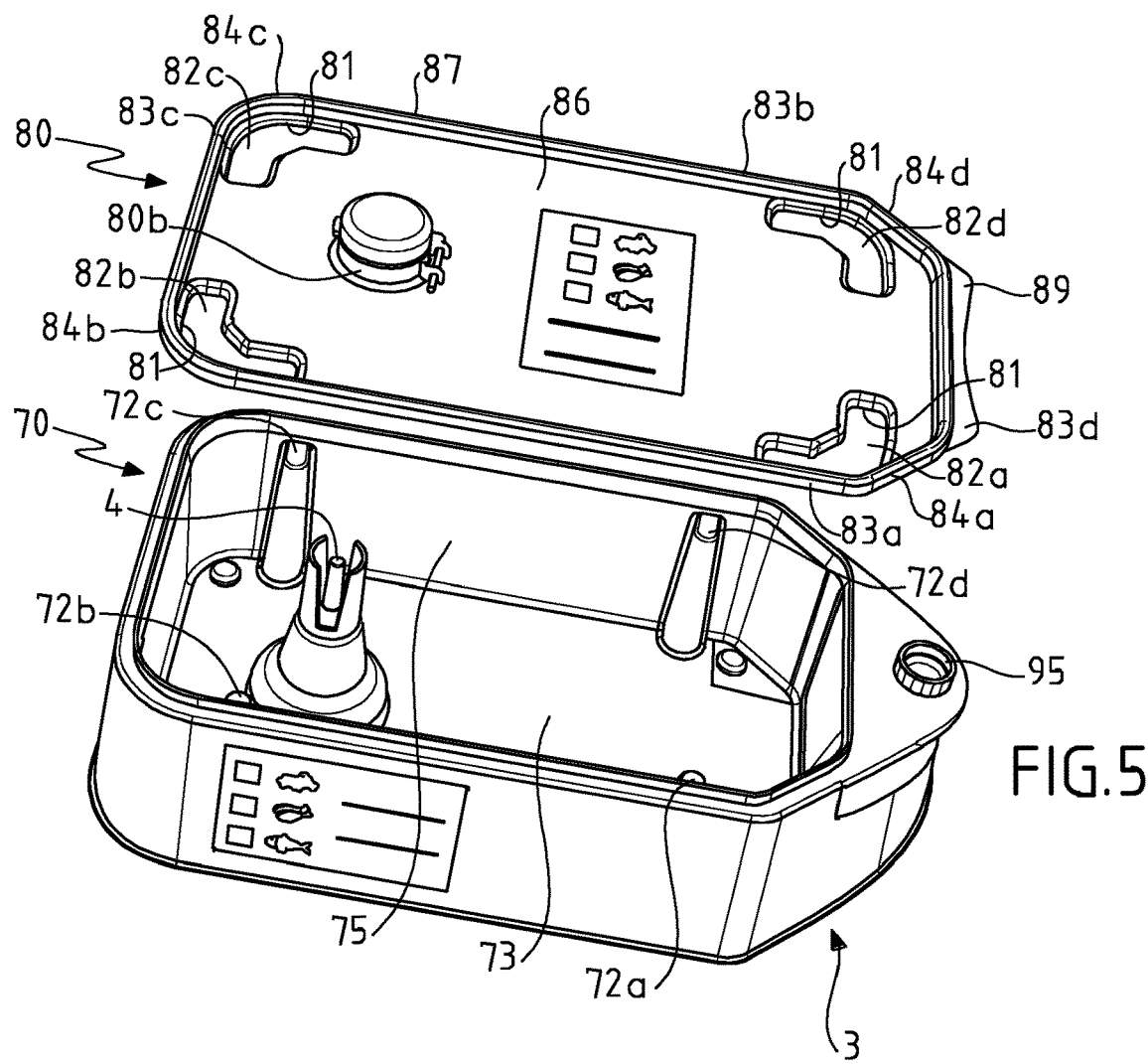
Figure 7:
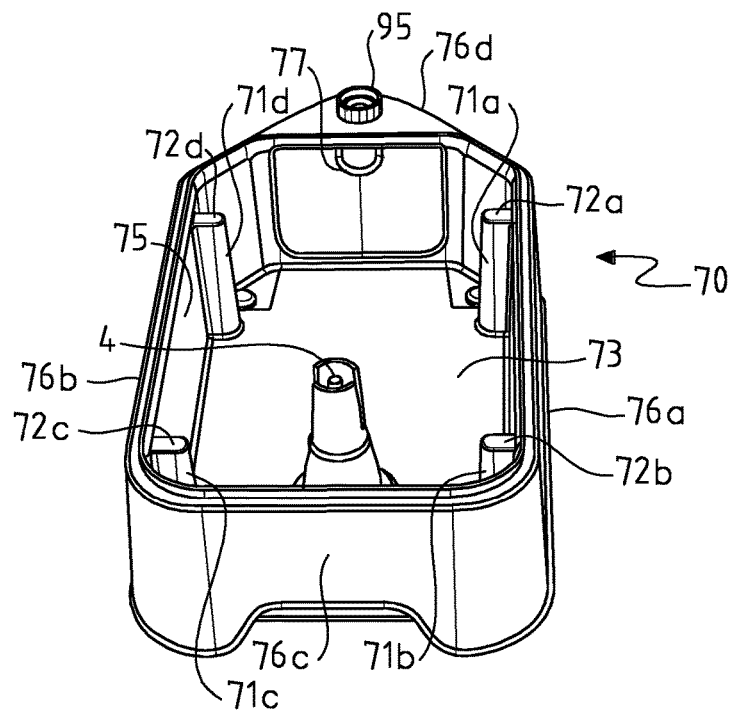
FIG. 7 is a perspective top view of a draining receptacle belonging to the draining base illustrated in FIGS. 1, 2, 5 and 6.
Figure 11:
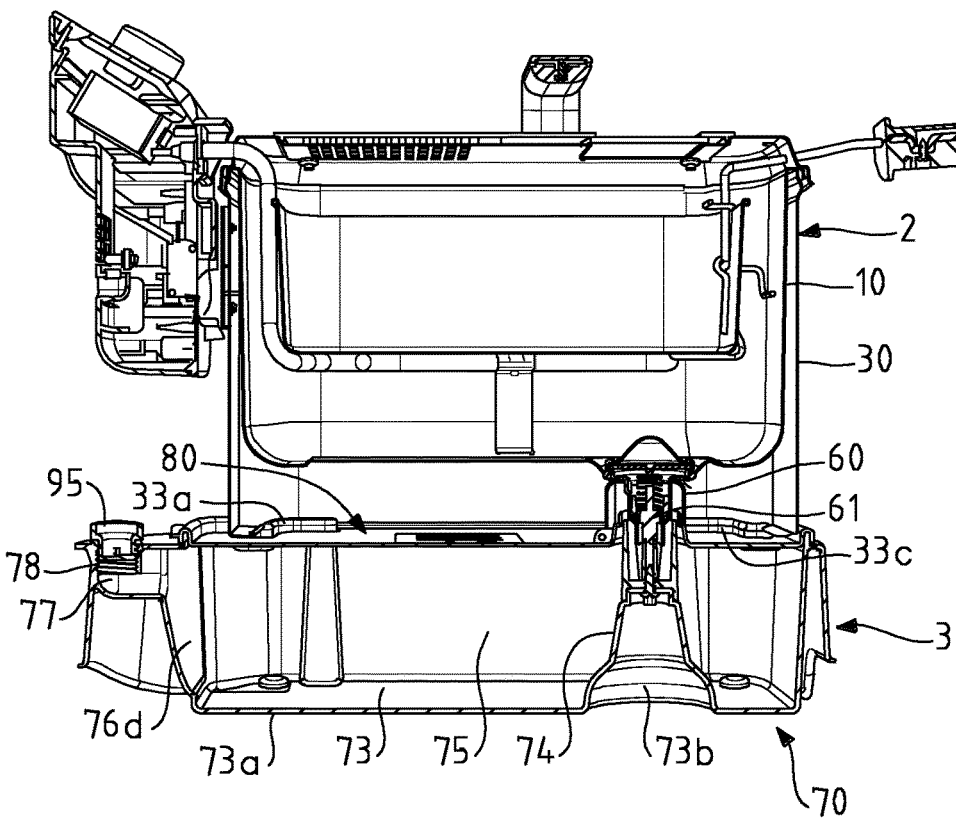
FIG. 11 is a cross-section view in elevation of the cooking assembly illustrated in FIGS. 1, 2, 9 and 10, in the drainage configuration corresponding to the recommended drainage configuration.
Figure 12:
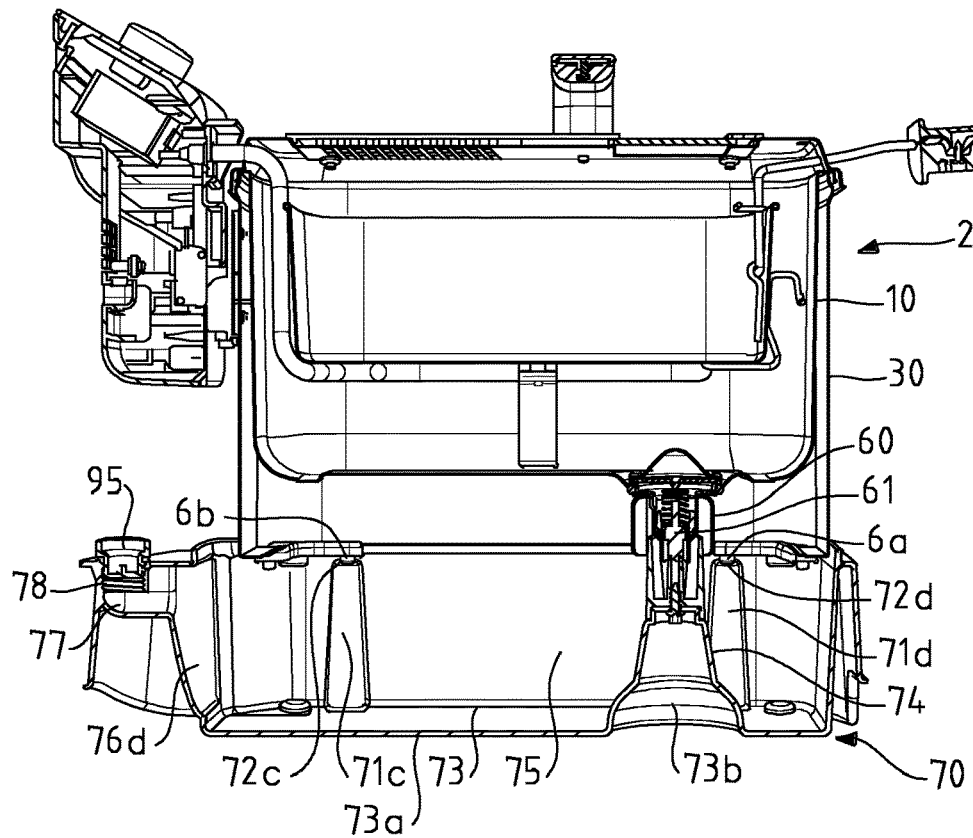
FIG. 12 is a cross-section view in elevation of the cooking assembly illustrated in FIGS. 1, 2, 9, 10, 11, in a drainage configuration corresponding to an alternative drainage configuration, in which the receptacle lid is not used.

The draining receptacle 70 has a control element 4, which can be best seen in FIGS. 5 and 7. The control element 4 is designed to actuate the valve 61. The valve 61 is capable of assuming a stable closed return position, in the absence of external action, to contain the cooking bath in the vat 10, and an open position, to enable the cooking bath to be drained, when the valve 61 is pushed back by the control element 4, as shown in FIGS. 9, 11 and 12. Thus, the control element 4 is configured to move the valve 61 to the open position when the draining receptacle 70 is holding the electric cooking appliance 2.

As can be seen in FIGS. 5 and 7, the draining receptacle 70 has a bottom 73 and a side wall 75 rising from the bottom 73 of the receptacle. The draining receptacle 70 has a configuration that extends in one direction. The draining receptacle 70 has two opposite sides 76a, 76b. The two opposite sides 76a, 76b extend according to said direction. A third side 76c is arranged perpendicular to both sides 76a, 76b. A fourth side 76d extends opposite the third side 76c. The side wall 75 houses a conduit 77 leading into a pour opening 78, as can be best seen in FIGS. 11 and 12. The conduit 77 is arranged in the fourth side 76d. A receptacle cap 95 closes the pour opening 78. The draining receptacle 70 comprises an outer peripheral wall 79 surrounding the side wall 75, which can be best seen in FIG. 9. The outer peripheral wall 79 extends away from a lower part of the side wall 75 of the draining receptacle 70.

Figure 10:
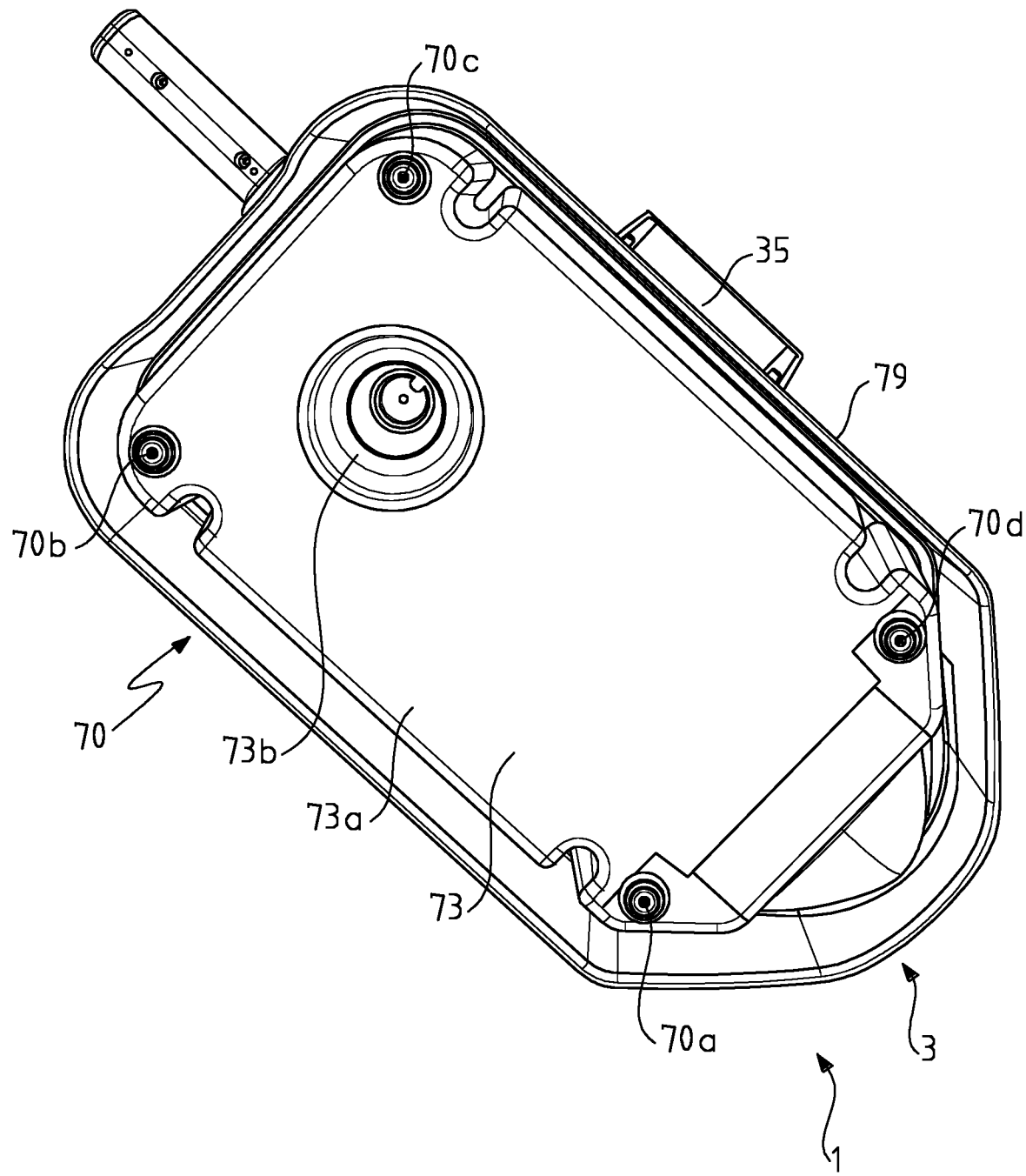
FIG. 10 is a bottom view of the cooking assembly illustrated in FIGS. 1, 2 and 9, in the drainage configuration corresponding to the recommended drainage configuration.

As can be best seen in FIGS. 9 and 10, the draining receptacle 70 has a lower face 73a comprising a housing 73b. Thus, the housing 73b is arranged under the bottom 73 of the receptacle. As can be seen in FIG. 9, the control element 4 originates from the lower face 73a of the draining receptacle 70 and the housing 73b extends below the control member 4.

As can be best seen in FIG. 7, the draining receptacle 70 comprises upper supports 72a, 72b, 72c, 72d. More particularly, the upper supports 72a, 72b, 72c, 72d originate from the side wall 75 of the draining receptacle 70. The upper supports 72a, 72b, 72c, 72d belong to pillars 71a, 71b, 71c, 71d originating from the bottom 73 of the receptacle. Pillars 71a, 71b, 71c, 71d originate from the lateral wall 75. Each of the upper supports 72a, 72b, 72c, 72d originates from the bottom 73 of the receptacle. All pillars 71a, 71b, 71c, 71d originate from opposite sides 76a, 76b.

As a variant, at least some of the pillars 71a, 71b, 71c, 71d may originate from one of the opposite sides 76a, 76b.

As can be best seen in FIG. 10, the draining receptacle 70 comprises receptacle feet 70a, 70b, 70c, 70d spaced apart from each other.

In the exemplary embodiment illustrated in the figures, the control element 4 originates from the draining receptacle 70. More particularly, the control element 4 originates from the bottom of the receptacle 73. The control element 4 is arranged at a distance from the side wall 75. As can be best seen in FIGS. 5, 7, 9, 11, 12 and 15, the bottom 73 of the receptacle has a protuberance 74 that holds the housing 73b. As can be best seen in FIG. 9, the control element 4 is formed by an attached part mounted on the protuberance 74.

Figure 8:
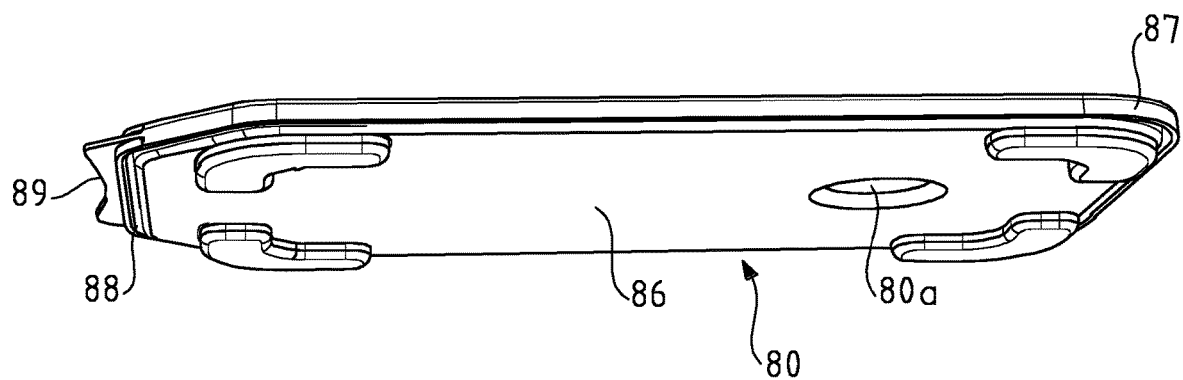
FIG. 8 is a perspective bottom view of a receptacle lid belonging to the draining base illustrated in FIGS. 1, 2, 5 and 6.

The receptacle lid 80 is configured to be mounted on the draining receptacle 70. The receptacle lid 80 houses an outlet 80a for the flow of the cooking bath into the draining receptacle 70 when the receptacle lid 80 is in place on the draining receptacle 70 to form the draining base 3 and when the draining base 3 is holding the electric cooking appliance 2. Thus, when the receptacle lid 80 is mounted on the draining receptacle 70, the receptacle lid 80 closes the draining receptacle 70, with the exception of the outlet 80a. The receptacle lid 80 has a peripheral edge 87 with a lower housing 88, as can be best seen in FIG. 8. The peripheral edge 87 has an external tongue 89 intended to facilitate the removal of the receptacle lid 80 from the draining receptacle 70. The receptacle lid 80 has a chimney 80b rising above a separating wall 86, as can be seen in FIG. 9. The separating wall 86 is surrounded by the peripheral edge 87. More particularly, in the exemplary embodiment illustrated in the figures, the chimney 80b houses the outlet 80a.

Figure 6:
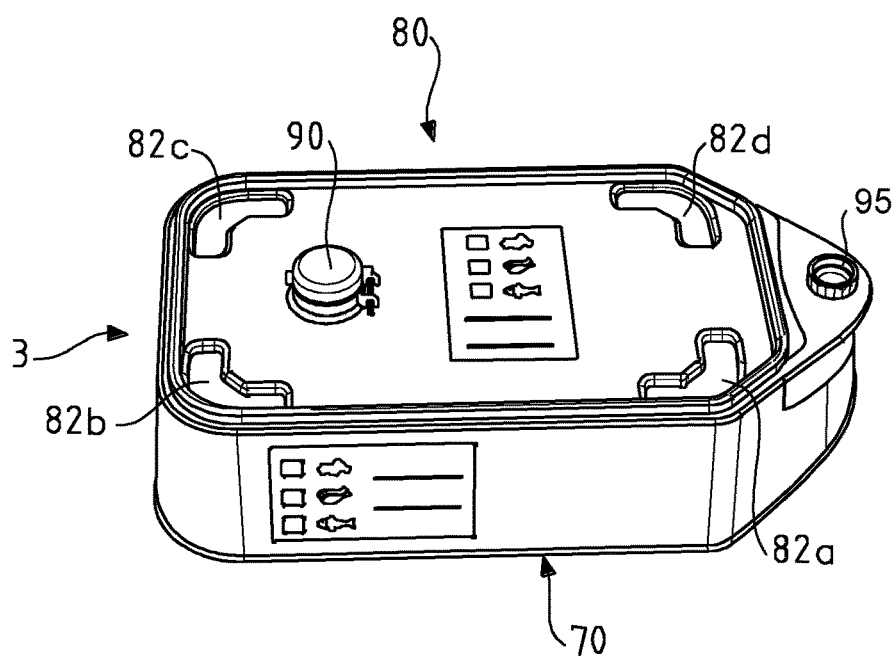
FIG. 6 is an assembled perspective view of the draining base illustrated in FIGS. 1, 2 and 5.

The lid cap 90 is designed to close the outlet 80a. In the exemplary embodiment illustrated in the figures, the lid cap 90 is mounted on the receptacle lid 80 such that it can move between a drain position in which the outlet 80a is open, not shown in the figures, and a storage position in which the outlet 80a is closed by the lid cap 90, shown in FIGS. 1, 2, 5 and 6. More particularly, in the exemplary embodiment illustrated in the figures, the lid cap 90 is pivotally mounted on the receptacle lid 80. The lid cap 90 is supported by the chimney 80b. If desired, the lid cap 90 can be removed from the receptacle lid 80. As shown in FIGS. 9, 11 and 12, the lid cap 90 has been removed from the receptacle lid 80. The lid cap 90 closes the outlet 80a when the draining base 3 is in the configuration for storing the cooking bath contained in the draining receptacle 70, as shown in FIG. 6.

In FIGS. 9, 11 and 12, the cooking assembly 1 is in a drainage configuration in which the control element 4 moves the valve 61 to the open position.

In FIGS. 9 and 11, the drainage configuration corresponds to a recommended drainage configuration, in which the draining base 3 is holding the electric cooking appliance 2. When the cooking assembly 1 is in this drainage configuration, the electric cooking appliance 2 rests on the receptacle lid 80. More particularly in the illustrated exemplary embodiment, the outer housing 30 rests on the receptacle lid 80 when the cooking assembly 1 is in this drainage configuration.

The receptacle lid 80 comprises side stops 81, which can be best seen in FIG. 5. The side stops 81 are configured to limit the lateral movements of the electric cooking appliance 2 resting on the receptacle lid 80. More particularly, the side stops 81 are surrounded by the outer edge 87.

The receptacle lid 80 presents an upper face comprising depressions 82a, 82b, 82c, 82d. The side stops 81 are formed by side walls of the depressions 82a, 82b, 82c, 82d.

The receptacle lid 80 has four main sides 83a, 83b, 83c, 83d. Each of the depressions 82a, 82b, 82c, 82d is arranged in an angle 84a, 84b, 84c, 84d defined by two main adjacent sides 83a, 83b, 83c, 83d, in this case the main sides 83a, 83d for angle 84a, the main sides 83a, 83c for angle 84b, the main sides 83c, 83b for angle 84c, the main sides 83b, 83d for angle 84d, as can be clearly seen in FIG. 5. One of the main sides 83a, 83b, 83c, 83d has several sections.

As a variant, the receptacle lid 80 may have several main sides 83a, 83b, 83c, 83d, and at least one of the depressions 82a, 82b, 82c, 82d may be arranged in an angle 84a, 84b, 84c, 84d defined by two adjacent main sides 83a, 83b, 83c, 83d.

As a variant, the receptacle lid 80 may have an upper face comprising at least one depression, the side stops being formed by side walls of the depression. If desired, said depression can in particular be annular or alveolar.

As can be partially seen in FIGS. 9 and 11, the separate housing feet 33a, 33b, 33c, 33d are configured to rest on the receptacle lid 80 when the cooking assembly 1 is in the drainage configuration. More particularly, the housing feet 33a, 33b, 33c, 33d rest in the depressions 82a, 82b, 82c, 82d when the cooking assembly 1 is in the drainage configuration.

The upper supports 72a, 72b, 72c, 72d extend under the receptacle lid 80 when the receptacle lid 80 closes the draining receptacle 70. As can be seen in FIG. 5, the upper supports 72a, 72b, 72c, 72d are arranged below the depressions 82a, 82b, 82c, 82d. When the electric cooking appliance 2 rests on the receptacle lid 80, the lower supports 5a, 5b, 5c, 5d are arranged vertically above the upper supports 72a, 72b, 72c, 72d.

In FIG. 12, the drainage configuration corresponds to an alternative configuration, in which the draining receptacle 70 holds the electric cooking appliance 2. The electric cooking appliance 2 rests on the upper supports 72a, 72b, 72c, 72d when the cooking assembly 1 is in this drainage configuration. More particularly in the illustrated exemplary embodiment, the outer housing 30 rests on the draining receptacle 70 when the cooking assembly 1 is in this drainage configuration.

The electric cooking appliance 2 has support zones 6a, 6b, 6c, 6d, which can be seen in FIG. 4. When the lower supports 5a, 5b, 5c, 5d rest on a support plane, the support zones 6a, 6b, 6c, 6d extend away from said support plane. When the cooking assembly 1 is in the drainage configuration, the support zones 6a, 6b, 6c, 6d rest on the upper supports 72a, 72b, 72c, 72d as can be partially seen in FIG. 12. More particularly in the illustrated exemplary embodiment, the lower supports 5a, 5b, 5c, 5d are arranged under the skirt 32, and the support zones 6a, 6b, 6c, 6d are arranged under the skirt 32. The support zones 6a, 6b, 6c, 6d originate from the feet of the housing 33a, 33b, 33c, 33d. The support zones 6a, 6b, 6c, 6d are separate from the lower supports 5a, 5b, 5c, 5d.

Figure 15:
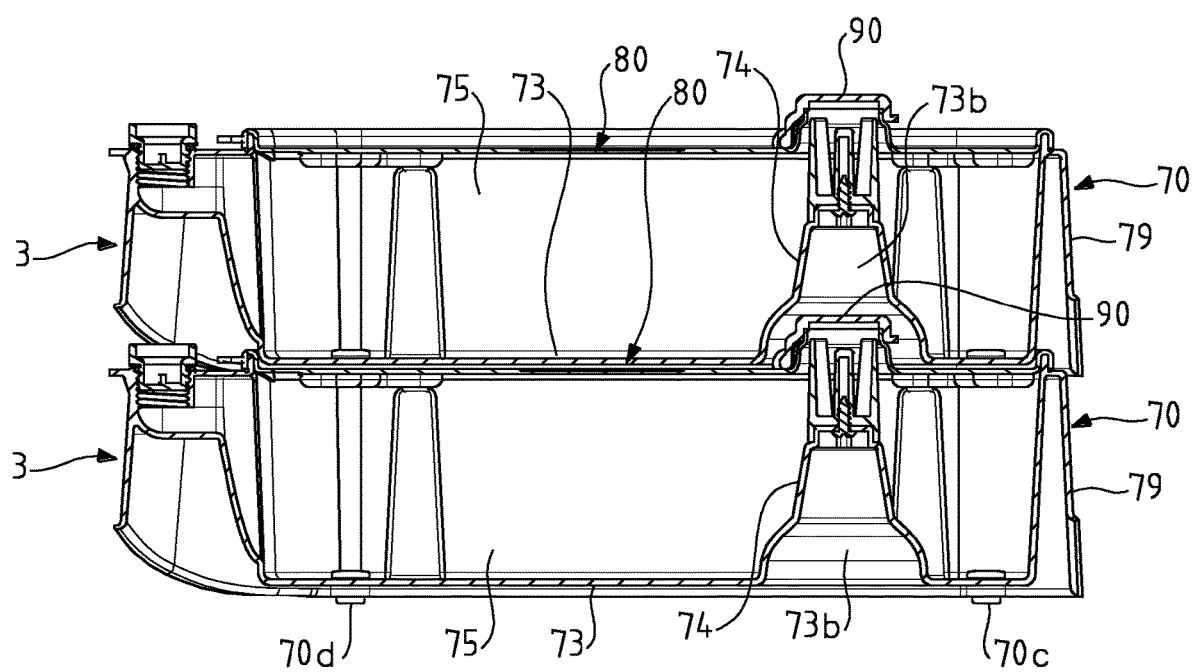
FIG. 15 is a second longitudinal cross-section view of the stacked draining bases illustrated in FIGS. 13 and 14.

The draining receptacle 70 and the receptacle lid 80 can be placed in a stacking configuration in which the draining receptacle 70 rests on the receptacle lid 80 and in which the housing 73b houses the lid cap 90 closing the outlet 80a of the receptacle lid 80, as can be seen in FIG. 15 illustrating two stacked draining bases 3.

Figure 13:
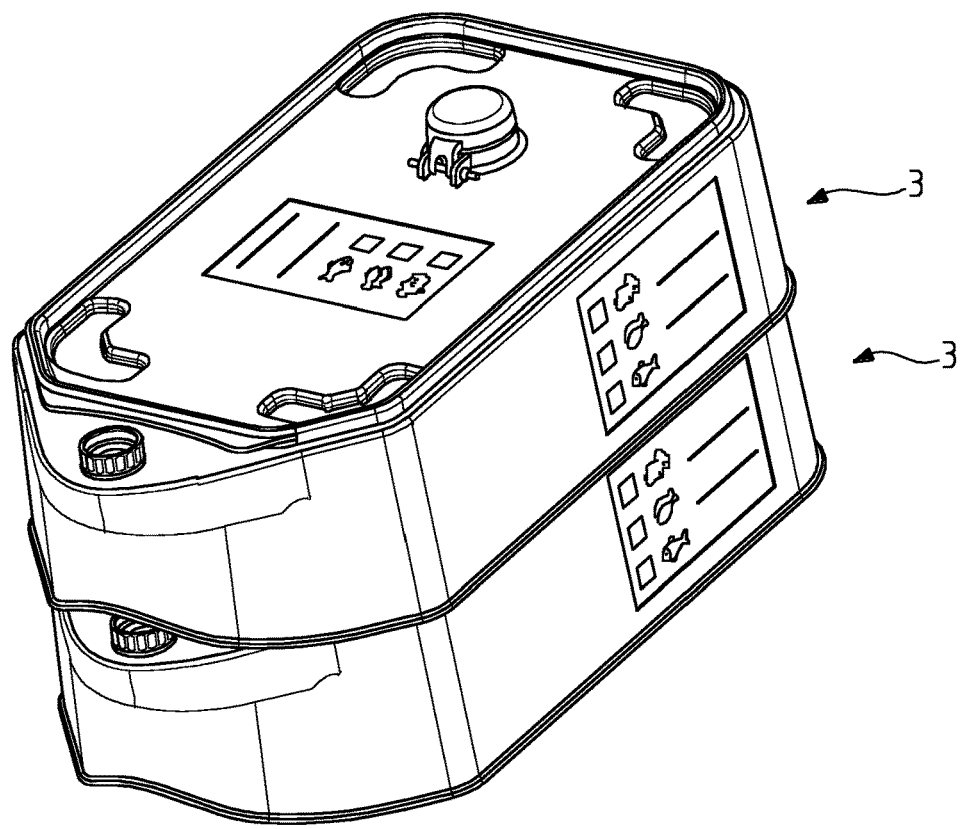
FIG. 13 is a perspective view of a storage configuration in which two draining bases illustrated in FIGS. 1, 2, 5 and 6 are stacked.
Figure 14:
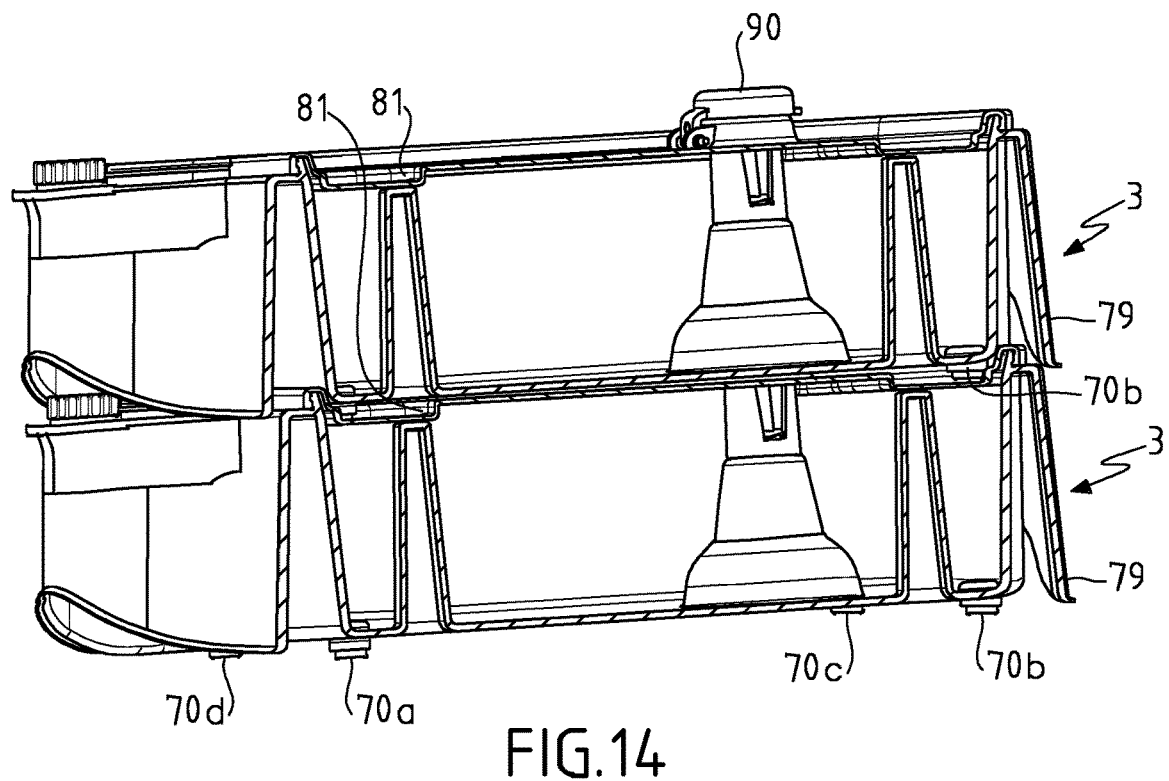
FIG. 14 is a first longitudinal cross-section view of the stacked draining bases illustrated in FIG. 13.

As shown in FIGS. 13 to 15, two draining bases 3 can be stacked. The side stops 81 are configured to limit the lateral movements of the draining receptacle 70 resting on the receptacle lid 80 in the stacking configuration. The receptacle feet 70a, 70b, 70c, 70d are configured to rest on the receptacle lid 80 when the draining receptacle 70 and the receptacle lid 80 are in the stacking configuration. More particularly, the receptacle feet 70a, 70b, 70c, 70d rest in the depressions 82a, 82b, 82c, 82d when the draining receptacle 70 and the receptacle lid 80 are in the stacking configuration. The upper supports 72a, 72b, 72c, 72d extend under the receptacle lid 80 when the receptacle lid 80 closes the draining receptacle 70. More particularly, the upper supports 72a, 72b, 72c, 72d are arranged below the depressions 82a, 82b, 82c, 82d. The outer peripheral wall 79 extends around the receptacle lid 80 when the draining receptacle 70 and the receptacle lid 80 are in the stacking configuration.

The cooking assembly 1 illustrated in the figures is used in the following manner. To drain a cooking bath contained in the vat 10, the user positions the electric cooking appliance 2 on the draining receptacle 70. The support zones 6a, 6b, 6c, 6d rest on the upper supports 72a, 72b, 72c, 72d of the draining receptacle 70. The control element 4 moves the valve 61 to the open position. The side wall 75 makes it possible to stabilize the electric cooking appliance 2 on the draining receptacle 70. Once the cooking bath has been drained, the user can remove the electric cooking appliance 2 and place the receptacle lid 80 on the draining receptacle 70, with the lid cap 90 in place on the receptacle lid 80 to store the cooking bath before using it again.

Various modifications and/or improvements that are obvious for the person skilled in the art can be made to the embodiment of the invention described in this description without departing from the scope of the invention defined by the claims.

The invention claimed is:

1. A cooking assembly comprising:
an electric cooking appliance; and
a draining receptacle,
the electric cooking appliance comprising a vat configured to receive a cooking bath, the vat equipped with a drainage system comprising a valve configured to assume a stable closed return position and an open position, the draining receptacle comprising a control element,
the cooking assembly having a drainage configuration in which the draining receptacle holds the electric cooking appliance and in which the control element moves the valve to the open position, wherein the draining receptacle comprises pillars extending from a side wall of the draining receptacle toward an interior of the draining receptacle, the pillars positioned within the interior of the draining receptacle, an upper end of the pillars extending from the side wall and defining upper supports extending from the sidewall, and wherein the electric cooking appliance rests on the upper supports when the cooking assembly is in the drainage configuration.

2. The cooking assembly according to claim 1, wherein the draining receptacle has a bottom and wherein each of the upper supports originates from the bottom of the draining receptacle.

3. The cooking assembly according to claim 1, wherein the draining receptacle has two opposite sides and wherein at least some of the pillars originate from one of the opposite sides.

4. The cooking assembly according to claim 3, wherein all of the pillars originate from the opposite sides.

5. The cooking assembly according to claim 3, wherein the draining receptacle has a configuration that is elongated in one direction and the two opposite sides extend in said direction.

6. The cooking assembly according to claim 1, wherein the electric cooking appliance has lower supports spaced apart from each other and configured to rest on a support plane.

7. The cooking assembly according to claim 6, wherein the electric cooking appliance has support zones resting on the upper supports when the cooking assembly is in the drainage configuration, and wherein the support zones are distinct from the lower supports.

8. The cooking assembly according to claim 7, wherein when the lower supports rest on a support plane, the support zones extend away from said support plane.

9. The cooking assembly according to claim 1, wherein the electric cooking appliance comprises an outer housing encasing the vat and wherein the outer housing rests on the draining receptacle when the cooking assembly is in the drainage configuration.

10. The cooking assembly according to claim 9, wherein the outer housing forms a skirt.

11. The cooking assembly according to claim 9, wherein the outer housing forms a skirt,
wherein the electric cooking appliance has lower supports spaced apart from each other and configured to rest on a support plane, and
wherein the lower supports are arranged under the skirt.

12. The cooking assembly according to claim 9, wherein the outer housing forms a skirt,
wherein the electric cooking appliance has lower supports spaced apart from each other and configured to rest on a support plane,
wherein the electric cooking appliance has support zones resting on the upper supports when the cooking assembly is in the drainage configuration, and wherein the support zones are distinct from the lower supports, and wherein the support zones are arranged under the skirt.

13. A cooking assembly comprising:
an electric cooking appliance; and
a draining receptacle,
the electric cooking appliance comprising a vat configured to receive a cooking bath, the vat equipped with a drainage system comprising a valve configured to assume a stable closed return position and an open position, the draining receptacle comprising a control element,
the cooking assembly having a drainage configuration in which the draining receptacle holds the electric cooking appliance and in which the control element moves the valve to the open position, wherein the draining receptacle comprises upper supports belonging to pillars extending from a bottom of the draining receptacle and defining a height in a direction perpendicular to the bottom, each of the pillars extending from a side wall of the draining receptacle along an entire height of the pillars, the pillars being positioned within an interior of the draining receptacle, and wherein the electric cooking appliance rests on the upper supports when the cooking assembly is in the drainage configuration.

14. A cooking assembly comprising:
an electric cooking appliance; and
a draining receptacle,
the electric cooking appliance comprising a vat configured to receive a cooking bath, the vat equipped with a drainage system comprising a valve configured to assume a stable closed return position and an open position, the draining receptacle comprising a control element,
the cooking assembly having a drainage configuration in which the draining receptacle holds the electric cooking appliance and in which the control element moves the valve to the open position, wherein the draining receptacle comprises upper supports belonging to pillars, wherein an end of the pillar opposite a bottom of the draining receptacle originates from a side wall of the draining receptacle, the pillars being positioned within an interior of the draining receptacle, and wherein the electric cooking appliance rests on the upper supports when the cooking assembly is in the drainage configuration.

* * * * *